2,767,196
WATER-SOLUBLE DERIVATIVES OF PHENOLPHTHALEIN

Ralph Salkin, Jackson Heights, N. Y., assignor to S. B. Penick and Company, New York, N. Y., a corporation of Delaware No Drawing. Application April 20, 1953,
Serial No. 349,939

5 Claims. (Cl. 260—343.4)

My invention relates to an improvement in the manufacture of water-soluble derivatives of phenolphthalein, an organic dyestuff, and to the new derivatives thus obtained.

Phenolphthalein is substantially water-soluble and therefore difficult to employ for many practical purposes. Yet it has very desirable properties, for example as a mild cathartic of prolonged action and as a substrate in the detection and estimation of various enzymes. For these applications it is essential that phenolphthalein should be available in a water-soluble, stable and, preferably, colorless form. Various water-soluble derivatives have been made but found to be unsatisfactory. For example, the sodium salt is a reddish-brown granular mass or a pale red powder which decomposes in air. The glycosides are expensive because large amounts of dehalogenating agents such as silver oxide are required in their preparation and the over-all yields of the process are poor. The sodium salt of the phosphate ester is difficult to make in pure form and good yields and remains stable only when kept dry, dark and cold. The glucuronide has limited application because glucuronic acid from which it is made, is quite expensive.

It is therefore an object of my invention to find a water-soluble form of phenolphthalein which is stable and preferably colorless and therefore more useful than the water-soluble compounds heretofore described. It is a further object of my invention to develop a process by which such a form can be made conveniently and inexpensively and which process can be readily adapted to large scale production. I have discovered that a new sulfate, particularly a new, disulfate ester of phenolphthalein and their water-soluble salts and my process of making them meet these requirements.

These sulfate esters are preferably prepared as alkali-, alkaline earth metal or amine ester salts. My process of making them involves mixing phenolphthalein with an excess of a tertiary amine-sulfur trioxide addition compound in an inert chlorinated hydrocarbon liquid, heating the mixture to effect sulfation, and isolating the crude disulfate ester from the reaction mixture. I have found that it is essential, in order to obtain a stable disulfate in good yields, that the tertiary amine-sulfur trioxide addition compound be applied in excess of theory required for reaction with the two hydroxyl groups of phenolphthalein and that it be pure and free from moisture and occluded acid. A tertiary amine-sulfur trioxide prepared in situ in the reaction mixture will invariably give an unstable disulfate ester. The inert chlorinated hydrocarbon may be chloroform, carbontetrachloride, ethylene dichloride, or trichlorethylene, but I prefer carbontetrachloride. Heating may be performed at the boiling point of the liquid used, preferably at from 60 to 90° C. The crude reaction product is isolated by cooling the reaction mixture and filtering off the precipitated granular material. This material is decomposed to liberate the sulfate ester, for example, by suspending it in water and neutralizing the suspension with alkali. I may use alkali- or alkaline earth metal hydroxides or carbonate or bicarbonates, the latter two being preferred. The liberated sulfate ester is extracted into a suitable solvent, preferably pyridine. The resulting solution is treated with a precipitant for the ester such as ethylether, and the resulting precipitate is separated from the supernatant liquid. The precipitate is the desired new metal sulfate ester salt in crude form. It may be recrystallized from a suitable solvent or solvent mixture preferably an alcohol-chlorinated hydrocarbon mixture such as methanol-chloroform.

I have found that the new sodium salt of the disulfate ester of phenolphthalein, particularly in its crystalline form, is a white, stable, freely water-soluble compound. This salt or any other alkali- or alkaline earth metal salt of the disulfate ester of phenolphthalein may serve as the starting material for the preparation of amine ester salts, for example, the triisopropanol amine, dibenzylethylene diamine, or cinchonidine salts. My new method is a substantial improvement in this art because it requires neither specialized equipment nor expensive ingredients, can readily be adapted to large-scale production, and gives yields of the ester salts in the order of 70 to 80% of theory.

The following examples illustrate my invention:

EXAMPLE I

Ten g. of U. S. P. phenolphthalein were dissolved in 40 ml. of pyridine and 100 ml. carbon-tetrachloride added. The above solution was added to a suspension of 40 g. of pyridine sulfotrioxide in 200 ml. of carbontetrachloride at room temperature over a ten minute period with vigorous agitation. On completion of the addition the mixture was refluxed for 15 minutes, chilled in an ice bath and the granular reaction product filtered. The cake was washed with fresh carbon-tetrachloride and sucked dry under a rubber dam.

The reaction product was decomposed in 300 ml. of water with 35 g. of sodium bicarbonate, 300 ml. of saturated salt solution were added and the reaction product shaken out three times each with 50 ml. portions of pyridine. The combined pyridine solution was washed several times with ether. The pyridine solution of the reaction product was diluted with 50 ml. of methanol, the solution charcoaled and filtered. The filtered solution was precipitated in 2 liters of anhydrous ether. The amorphous product was filtered off and recrystallized from 50 ml. of 50% ethanol.

*Yield 11 grams*

For the preparation of an analytically pure sample 2 g. of the above were dissolved in 10 ml. anhydrous methanol, dry chloroform was added to turbidity and the solution charcoaled, filtered, and refrigerated. Yielded snow white crystals in 85% yield which gave, after drying to constant weight at room temperature in vacuo the following constants:

| | Found | Theory for $C_{20}H_{12}O_{10}S_2Na_2 \cdot H_2O$ |
|---|---|---|
| Sulfated ash_____percent__ | 26.4 | 26.3 |
| Phenolphthalein Content (AOAC) percent__ | 58.5 | 58.92 |
| Abderhalden Moisture, 3 hrs. at 110° C_____percent__ | 3.38 | 3.33 |
| Free Phenolphthalein_____ | Nil | |
| pH 10% aqueous solution_____ | 5.95 | |

The material so prepared was stable. Six months after the preparation was completed, samples stored in well filled tightly capped vials showed no evidence of decomposition.

EXAMPLE II

Five hundred g. of yellow phenolphthalein (Merck Index, sixth edition, page 1015) were dissolved in 2000 ml. of pyridine and 5000 ml. carbon tetrachloride added. This solution was purified with "Norite" and added to a suspension of 2 kg. of pyridine-sulfur trioxide in 15 liters of carbon tetrachloride at 45° C. with vigorous agitation over a one hour period. When the addition was completed the suspension was refluxed for 15 minutes to insure completeness of the reaction, chilled overnight, and the resulting granular precipitate filtered off. The cake was washed with fresh carbon tetrachloride and sucked as dry as possible.

The granular material was then decomposed by suspending it in 3,700 ml. of warm water (50° C.) and adding 1,750 g. of sodium bicarbonate. Five hundred ml. of pyridine were then added to the vigorously stirred mixture, and the dark brown pyridine solution remaining after breaking of the mixture was washed with saturated salt solution and then concentrated in vacuo to 1,500 cc. Eight liters of warm methanol were added to this concentrate and the mixture refluxed for 15 minutes. Thirty g. of "Norite" were added and the suspension filtered.

The methanolic filtrate was concentrated to 2.5 liters and the precipitate of inorganics again filtered off. The pyridine-methanol solution of the reaction product was poured with vigorous stirring into 18 liters of ether.

The granular precipitate thus obtained was slurried with fresh ether and filtered and sucked dry as possible. The crude moist salt was dissolved in 3 liters of methanol, the solution refluxed for ½ hour with 20 g. of "Norite" and filtered. The lightly amber colored filtrate was concentrated to 2 liters and reprecipitated in 15 liters of ether with vigorous stirring. The precipitate was filtered off and washed with about 2 liters fresh ether and dried to constant weight in vacuo at 50–55° C.

Yield: 626 g. (73% theory) of the sodium salt of the disulfate ester of phenolphthalein, a white to cream colored amorphous powder, stable in air at ordinary temperatures and only slightly hygroscopic. If desired, the powder can be recrystallized from mixed organic solvents as described in Example I.

The powder had the following constants:

| | Found | Theory for $C_{20}H_{12}O_{10}S_2Na_2 \cdot H_2O$ |
|---|---|---|
| Sulfated ash..............percent.. | 27.95 | 26.3. |
| Moisture..................do.... | 4.4 | 3.3. |
| Phenolphthalein Content...do.... | 59.8 | 58.92. |
| Free Phenolphthalein.............. | Nil | Less than .02%. |
| pH 10% aqueous solution........... | 5.75 | |

The powder was very soluble in methanol and water, insoluble in ether. Aqueous solutions of this material (10%) stored in flint glass vials showed no evidence of decomposition on 3 months' standing at room temperature.

What I claim is:

1. The sodium salt of the disulfate ester of phenolphthalein.

2. The process which comprises mixing, in an inert chlorinated hydrocarbon medium under anhydrous conditions and in the presence of pyridine phenolphthalein and a pyridine sulfur trioxide addition compound free from occluded moisture and acid in an amount in excess of theory required for reaction with the two hydroxyl groups of phenolphthalein, boiling the mixture until formation of the solid reaction product is complete, and filtering off the reaction product.

3. The process of making a water-soluble salt of a sulfate ester of phenolphthalein which comprises mixing, in an inert chlorinated hydrocarbon medium under anhydrous conditions and in the presence of a pyridine, phenolphthalein and a pyridine sulfur trioxide addition compound free from occluded moisture and acids in an amount in excess of theory required for reaction with the two hydroxyl groups of phenolphthalein, boiling the mixture until formation of the solid reaction product is complete, filtering off the reaction product, decomposing it in an alkaline medium, and isolating the salt from the medium.

4. The process of making the sodium salt of the disulfate ester of phenolphthalein which comprises mixing, in carbon-tetrachloride under anhydrous conditions and in the presence of pyridine, phenolphthalein and pyridine-sulfur trioxide free from occluded moisture and acids in excess of theory required for reaction with the two hydroxyl groups of phenolphthalein, boiling the mixture until formation of the solid reaction product is complete, chilling the mixture, filtering off the reaction product, decomposing it in aqueous sodium bicarbonate solution, adding a saturated salt solution, shaking out the salted-out reaction product with pyridine, washing the pyridine solution with ether, diluting it with methanol, charcoaling and filtering it, precipitating the filtered solution in anhydrous ether, filtering off the amorphous precipitate and recrystallizing it from methanol chloroform.

5. Water-soluble derivatives of phenolphthalein selected from the group consisting of the alkali and alkali earth metal salts of the disulfate ester of phenolphthalein.

References Cited in the file of this patent

UNITED STATES PATENTS

| 2,245,535 | Stallmann et al. | June 10, 1941 |
| 2,507,944 | Taras | May 16, 1950 |

FOREIGN PATENTS

| 602,216 | Germany | Sept. 3, 1934 |

OTHER REFERENCES

Huggins et al.: J. Biol. Chem., vol. 159, pp. 399–410 (1945).

Young et al.: Nature, vol. 169, pp. 711–12 (Apr. 26, 1952).

Whitehead et al.: Biochem., J. vol. 51, pp. 585–94 (Aug. 1952).